(12) United States Patent
Riewrangboonya et al.

(10) Patent No.: US 9,916,148 B2
(45) Date of Patent: Mar. 13, 2018

(54) SYSTEM FOR MANAGING SOFTWARE PACKAGE CONFIGURATION

(71) Applicant: VMware, Inc., Palo Alto, CA (US)

(72) Inventors: Wit Riewrangboonya, Mountain View, CA (US); Michael Toback, Saratoga, CA (US); David Byard, San Jose, CA (US); Nick Tenczar, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 74 days.

(21) Appl. No.: 14/957,233

(22) Filed: Dec. 2, 2015

(65) Prior Publication Data
US 2017/0161046 A1 Jun. 8, 2017

(51) Int. Cl.
*G06F 9/445* (2006.01)

(52) U.S. Cl.
CPC . *G06F 8/61* (2013.01); *G06F 8/65* (2013.01)

(58) Field of Classification Search
None
See application file for complete search history.

(56) References Cited

U.S. PATENT DOCUMENTS

2011/0231838 A1* 9/2011 Wookey .............. G06F 8/68
717/178
2015/0186125 A1* 7/2015 Avery ................. G06F 8/61
717/174

* cited by examiner

*Primary Examiner* — Evral E Bodden

(57) ABSTRACT

A method for managing a software package, including: accessing a request to process one or more package definitions in relation to a data repository which retains package definitions, wherein the one or more package definitions is associated with the software package; determining a status of an assertion that indicates either a completed assertion or an incomplete assertion; if the status is determined to be the incomplete assertion, then determining requirements for the software package to be configured for the hyper-converged appliance; attempting to find a match for the assertion in a pool of known resolvable assertions, wherein the match will allow the assertion to be resolved through accessible provisions and thereby fulfill the requirements; if the match is found, then using the accessible provisions to resolve and thereby complete the assertion; and if the assertion is completed, continuing an installation process of the software package.

20 Claims, 9 Drawing Sheets

SYSTEM FOR MANAGING SOFTWARE PACKAGE CONFIGURATION

BACKGROUND

Computer applications are made up of one or more software packages. Packages may be dependent on other packages and require that specific pieces of data be defined before they work properly. For example, one can install a software package that enables remote file access, but network information such as a DNS server address is needed for the package to work properly. Sometimes this information is already associated with other packages that are already installed or that a package is dependent on. Other times, the user requesting the package be installed must be prompted for the information.

Conventionally, a package manager is a collection of software tools that automates the process of installing, upgrading, configuring, and removing software packages from a system in a consistent manner. The package manager maintains a database of software dependencies and version information to prevent software mismatches and missing prerequisites. The package manager may also act as an intermediary between external repositories, not necessarily storing source or binary data, but knowing where that data resides. It also maintains a data structure capturing relationships between versions of packages and the current operating environment. For example, running on Ubuntu 14.04 and requesting the install of a package by name but not version, the package manager will be able to determine what version of a package needs to be installed if any is available that matches that name, any required dependencies needed before that package can be installed, and any information needed during the install process associated with that package.

A hyper-convergent appliance is a device that consists of one or more computer nodes running one or more workloads to control the hyper-convergent appliance. For example, a Linux Container™ (LXC™) is a workload that has operating system-level capabilities which make it possible to run multiple isolated Linux™ systems or containers, on one control host (the LXC™ host). LXC™ serves as a lightweight alternative to full machine virtualization via hypervisors like KVM™, VMware's ESXi™ or Xen™. When installing software packages on a hyper-convergent appliance, knowledge is needed regarding the computer nodes and the virtual machines running on the computer nodes. However, conventional package managers do not interact with operating environments external to the computer nodes. Additionally, all conventional package managers can only access knowledge from installed files or previously installed packages. Thus, limitations exist with regard to conventional package managers.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

The figures are provided in order to provide a thorough understanding of the present invention. The figures should not be construed as limiting the breath of the invention in any manner.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
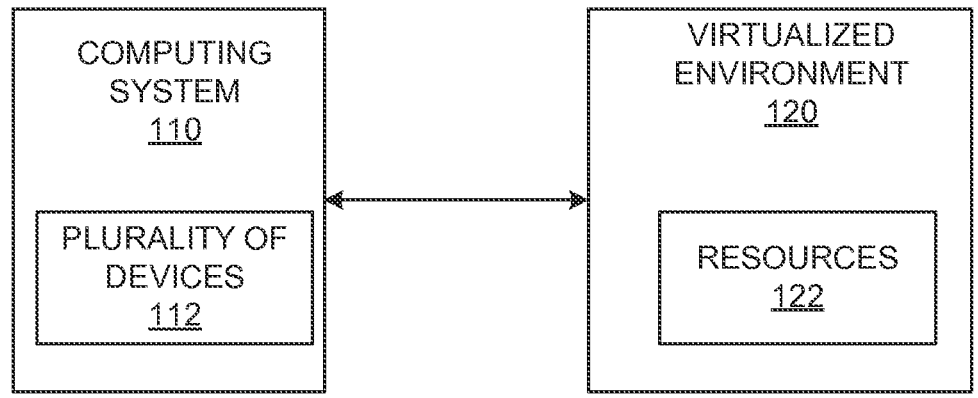
FIG. 1 is a block diagram of a virtual computing environment, in accordance with an embodiment.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., Windows™, Vista™, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped (or even deployed based on a pre-set blue-print). That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
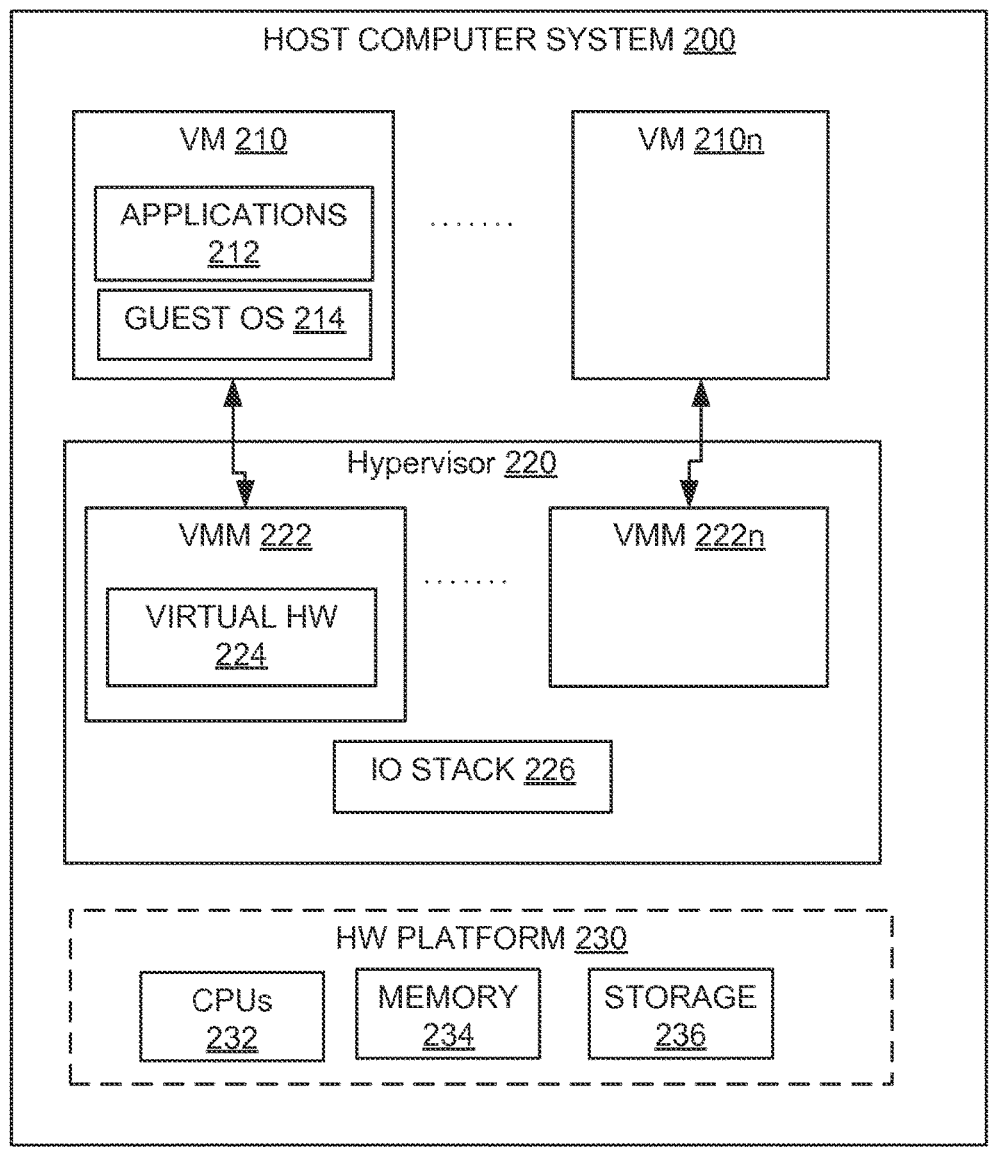
FIG. 2 is a block diagram of a host computing system, in accordance with an embodiment.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
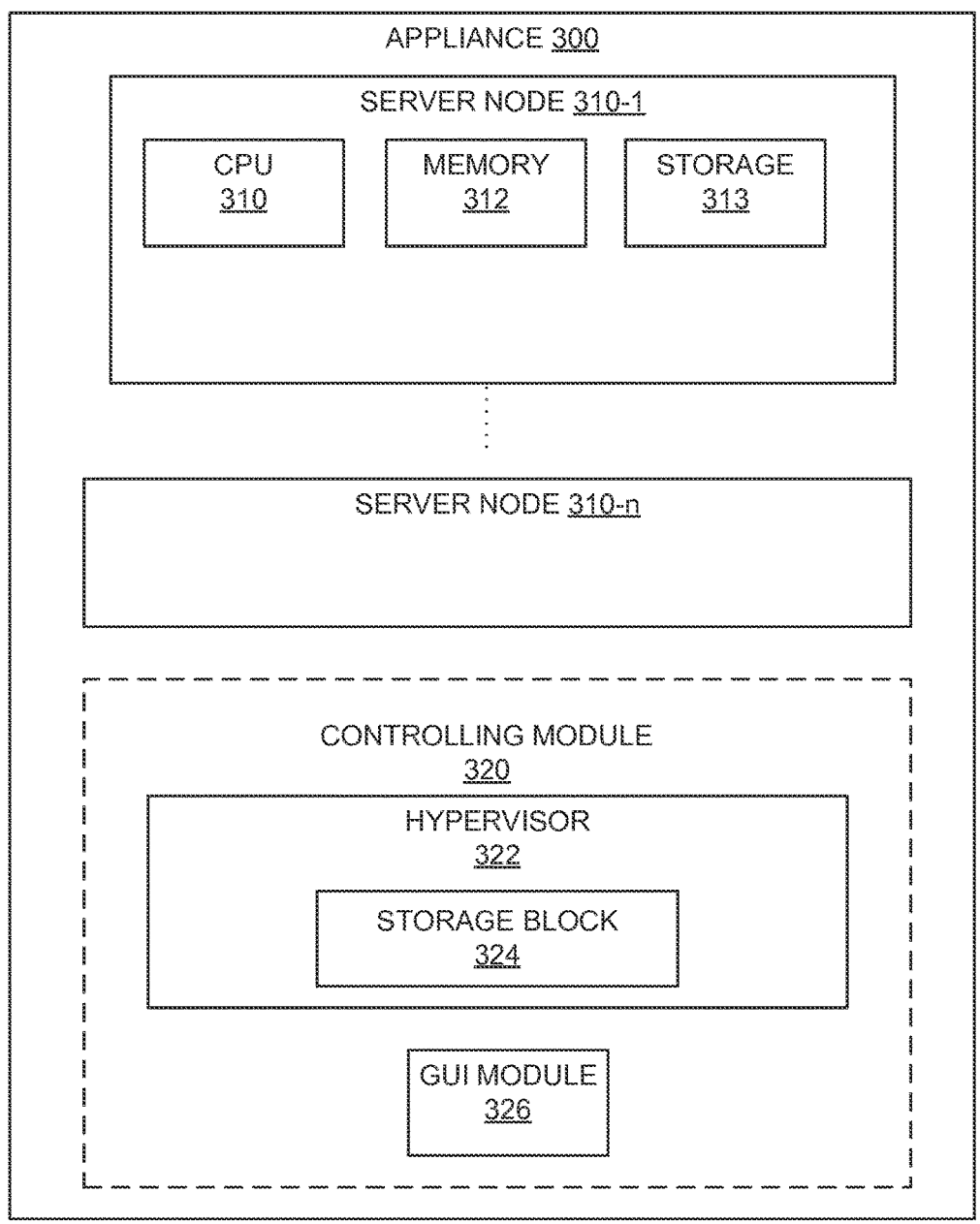
FIG. 3 is a block diagram of an appliance, in accordance with an embodiment.

FIG. 3 depicts an embodiment of appliance 300. The appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Additionally, each server node includes a hypervisor. For example, server node 310-1 includes hypervisor 314 and server node 310-n includes hypervisor 322.

As described above, a hypervisor is installed on top of hardware platform (e.g., CPU, memory and storage) and supports a virtual machine execution space within which one or more virtual machines (VMs) may be concurrently instantiated and executed.

In various embodiments, a hypervisor (e.g., hypervisor 314 and 322) is VMware ESX™ hypervisor or a VMware ESXi™ hypervisor. It is noted that "ESX" is derived from the term "Elastic Sky X" coined by VMware™. Additionally, as stated above, if hypervisor is a VMware ESX™ hypervisor, then virtual functionality of the host is considered a VMware ESX™ server. Moreover, although the node is physical hardware it includes hypervisor functionality based on the hypervisor implemented on the server node.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

It should be appreciated that software module 320, in one embodiment, includes a suite of software tools for cloud computing (e.g., VMware vSphere™' Venter™) that utilizes various components such as a VMware ESX/ESXi hypervisor. Accordingly, software module 320 may be a controlling module for at least appliance 300 based on the controlling software tools (e.g., VMware vSphere™, VCenter™).

Software module 320, in one embodiment, includes a centralized management tool for an appliance or a cluster of appliances, which will be described in further detail below. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface. Additionally, the centralized management tool manages or controls the hypervisors in appliance 300. For example, the centralized management tool controls the hypervisor it runs in (e.g., hypervisor 322) and controls the other hypervisors (e.g., hypervisor 314) in the other nodes (e.g., server node 310-1). The centralized management tool may also include a federated SSO module and auto-discovery module which are described in further detail below. The centralized management tool, in one embodiment, is centralized management tool 830 as described herein with at least reference to FIG. 8.

The software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
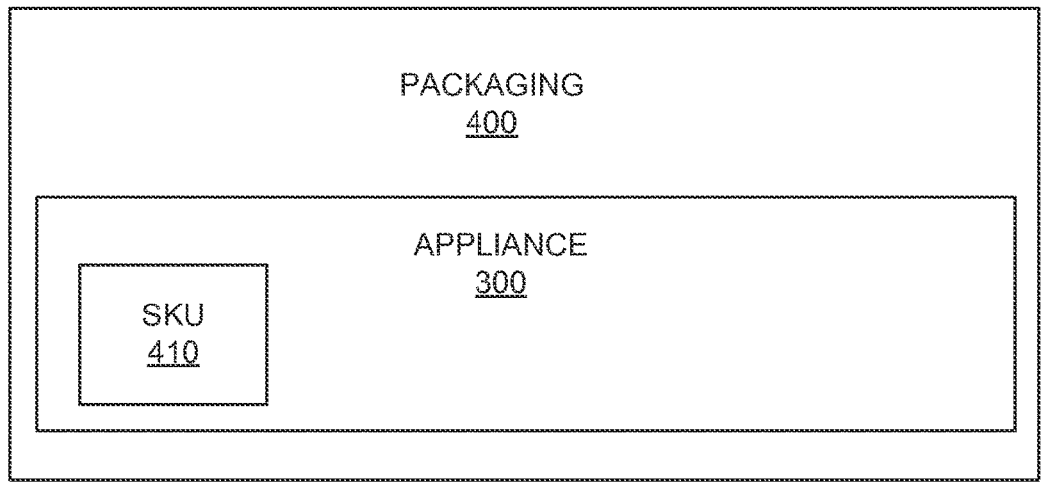
FIG. 4 is a block diagram of a side-view of an appliance offered for sale, in accordance with an embodiment.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Next, an example of virtual infrastructures will be discussed, along with a general overview of embodiments and related terminology.

Figure 5:
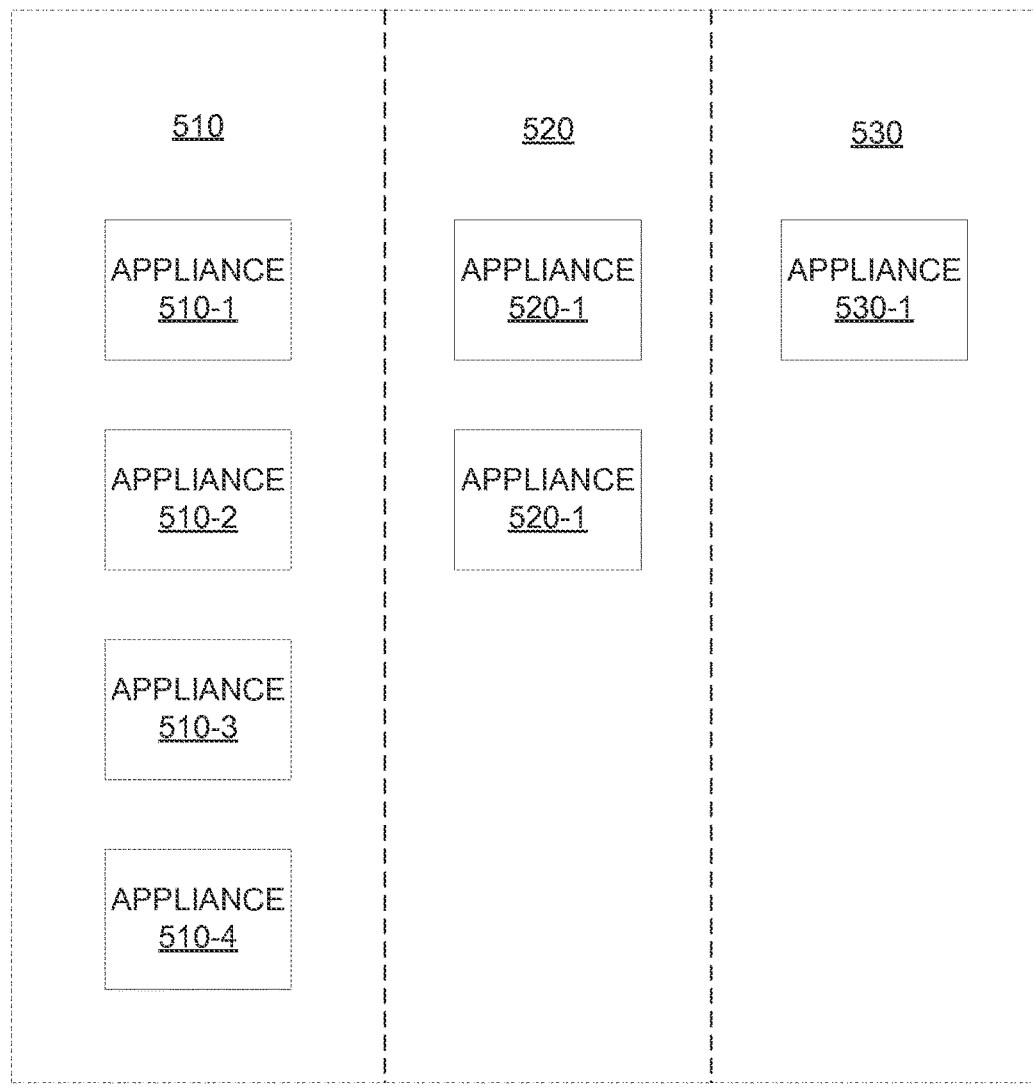
FIG. 5 is a block diagram of a virtualization infrastructure, in accordance with an embodiment.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Facts are defined by assertions. An assertion can be represented by a tuple. A tuple consists of pieces of information that together make-up an assertion. For example, the following, "("David", 28, "San Jose")", asserts that an object named David is associated with the number 28 and the object "San Jose". Another example, ("vc.ip", "192.162.1.1") creates an assertion that the object "vc.ip" is associated with the string "192.162.1.1". The meaning of the values is specified by the system, so that in the former case it may be that a person named David is 28 and lives in San Jose, while in the latter case the network address of vc.ip is 192.162.1.1.

In one or more embodiments, an assertion contains metadata defining how the assertion can be completed on installation, if it is not already completed. This could be completed implicitly on installation if there is no further information that is needed other than that the component is available. It could also be completed by executing code, by examining the execution environment, by examining the network environment, or by looking it up in a database.

In some embodiments, completing an assertion could be replacing the value in a string by a command or reference to a command. In one or more embodiments, the command would be configured as part of the assertion in such a way to differentiate it from a value. For example, ("vc.ip", @get_vc_address) would be a reference to a script stored on the computer named get_vc_address which would run on installation to return a value which is assumed to be the value to complete the assertion. In one or more embodiments, the script may reside inside the package.

A completed assertion is one where the values for the assertion have been provided, such as ("David", 28, "San Jose"). An incomplete assertion is one where one or more data values are not provided. For instance ("David", ?, "San Jose") would be incomplete because it is missing the second parameter of the tuple. Assertions must be completed either on submission of the package or by packages that are already installed.

In one or more embodiments, completed assertions are associated with the package that completes them. The assertions include the source of the assertion so that the value completing them can be maintained at the source. In one or more embodiments, packages that are installed in a hyper-convergent appliance provide one or more assertions that can be used to complete the configuration of other packages.

When a new package is to be installed, it may contain both complete and incomplete assertions. Once it is determined that it contains incomplete assertions, an attempt is made to find a matching assertion in the pool of known resolvable assertions to see if it can be resolved. If the assertion cannot be resolved, in one or more embodiments, it is determined whether or not the assertion can be resolved by user prompt or other source such as the network, a service on the network, or the appliance itself. The completion of these assertions depend either on other packages or on an external source such as users or default configuration. In the case where the completion of the assertion cannot be supplied, the installation process will only continue if the assertion is tagged as not required. If it can be supplied, then the assertions are resolved by querying the provider of the facts.

In one or more embodiments, where dependencies are implicit, components can publish their existence as a dependency. For example, if a component encapsulates a service called "vCenter", then it can publish a complete assertion ("have_vCenter", "true"). Then any other components that need vCenter could publish the incomplete assertion ("have_vCenter",?) which would then get bound to the latter complete assertion on install. Further, knowing the source of the assertion would imply the name of the component to link to the new component on install.

In one or more embodiments, if two packages could provide the same completed assertion, they cannot both be installed, thus preventing multiple paths or circular dependencies. This is one way in which a dependency is resolved. For example, if a new package could provide a completed assertion that is in fact related to something that is already installed, it would generate an error that would prevent it from being installed.

In one or more embodiments, certain assertions are tagged as preferred resulting in notifications being sent to the user in the form of warnings. In other embodiments, certain assertions are tagged as optional and produce no warning. Whether or not an assertion is required, preferred with notification or optional should be part of the metadata associated with the assertion.

In one or more embodiments, the system is controlled by a module called a package manager that manages software packages (e.g., installation, removal, etc.) on a hyper-converged appliance, and includes at least the following modules residing at the package manager: a package definition request accessor; an assertion status determiner; a requirement determiner; a match finder; an assertion completer; and a software package installer. A description of important related concepts that help describe the aforementioned modules follows, with reference specifically to "package(s)" and "actions".

A package is an installable and removable piece of functionality. A package can also define required assertions used by other packages (dependencies). When a package is being configured during the process of installing it in the hyper-converged appliance, dependencies will be pulled from packages that provide them and are used for the configuration process. A package definition includes one or more of the following: a package name; a reference to the installable files; a list of names of packages that said package depends upon; and one or more assertions.

In one or more embodiments, assertions may not be available from any one package but required for installation of others. To implement this, a repository may contain one or more empty packages that are not linked to any binaries but contain one or more assertions.

In one or more embodiments, the installation of the package means that the package and its' artifacts become known and are installable. It does not mean that the binary files associated with the package are stored in a local repository. Rather, it means that, during installation, the location of the files needed becomes known and can be accessed when installation is required.

An action is a process to change the hyper-convergent appliance state to a target state from an arbitrary initial state. In one or more embodiments, an action can be viewed as a monad; that is, "a structure that represents computations defined as a sequence of steps". This could be chaining or nesting of operations.

Packages are associated with one or more actions that can be used to configure the package. Actions may reference dependencies to actuate the required outcome. A package may support one or more actions, and enumerate those actions required to configure the package.

An action is specified by defining what the state change in the appliance will be upon execution of the action, and what assertions are required.

As a result of a sequence of actions, one or more packages are installed, configured or uninstalled.

In one or more embodiments, the software running the hyper-converged appliance itself can be a package. The end state of the cluster of nodes would be to have those packages installed which convert each of the nodes into a member node of the hyper-converged appliance, with a controlling VM installed on one of the nodes. In one or more embodiments, initial assertions would include the number of nodes supported and the version of the hyper-converged appliance. Incomplete assertions, for example, would include the IP range to use for setting up the nodes, the ip address and port associated with one or more applications integrated with the hyper-converged appliance (some of which could be optional), and network parameters such as the virtual lan addresses.

In one or more embodiments, logging could be implemented as a package, where the logger is installed on another appliance or is installed on the current appliance. An assertion such as "logger_address" could be incomplete if the install is remote and the user would be prompted for the address, or it could be completed as "local" meaning that the logger should be installed on the current appliance.

Example Package Manager

Figure 6:
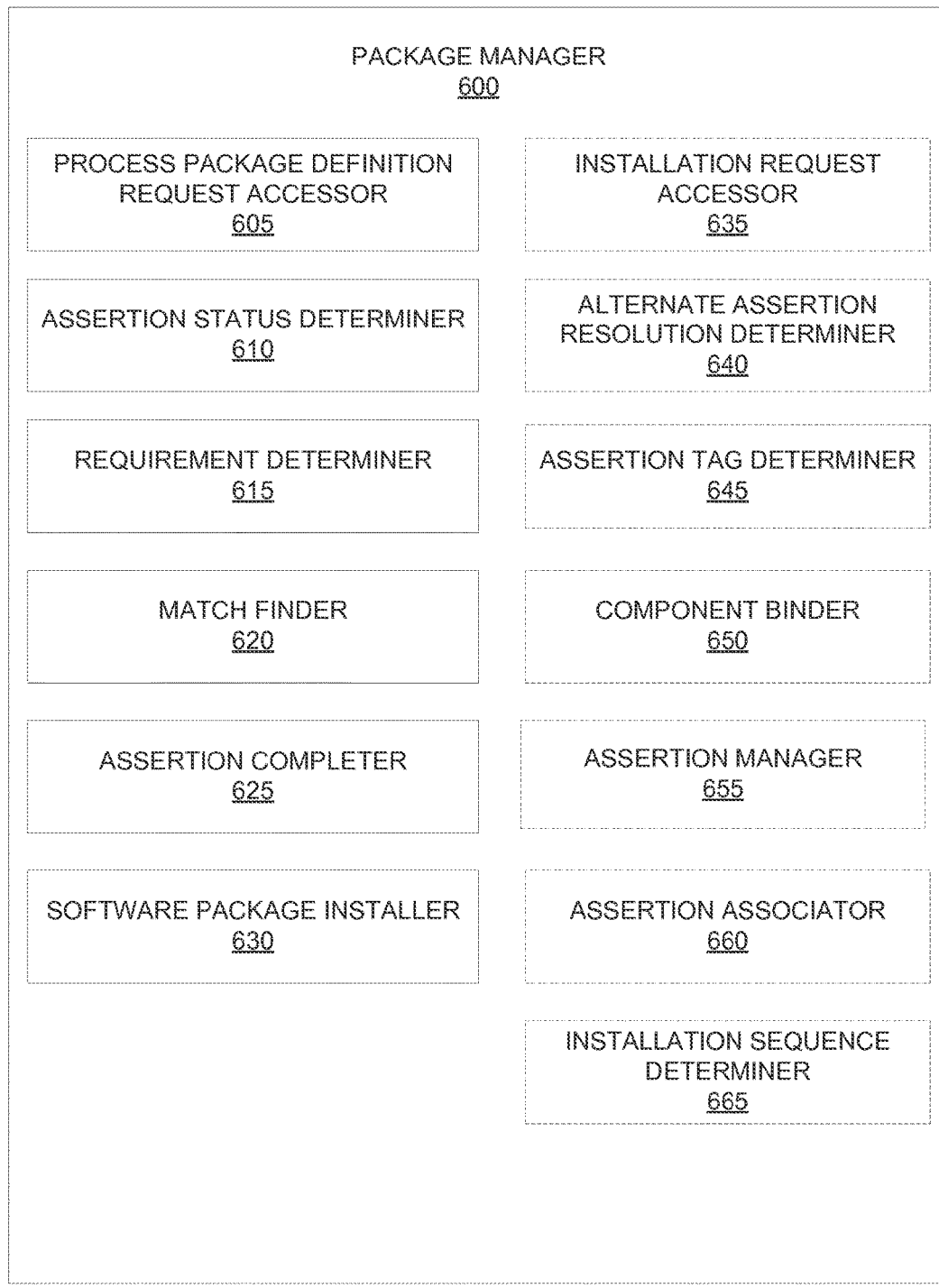
FIG. 6 is a block diagram of an example package manager, in accordance with an embodiment.
Figure 7:
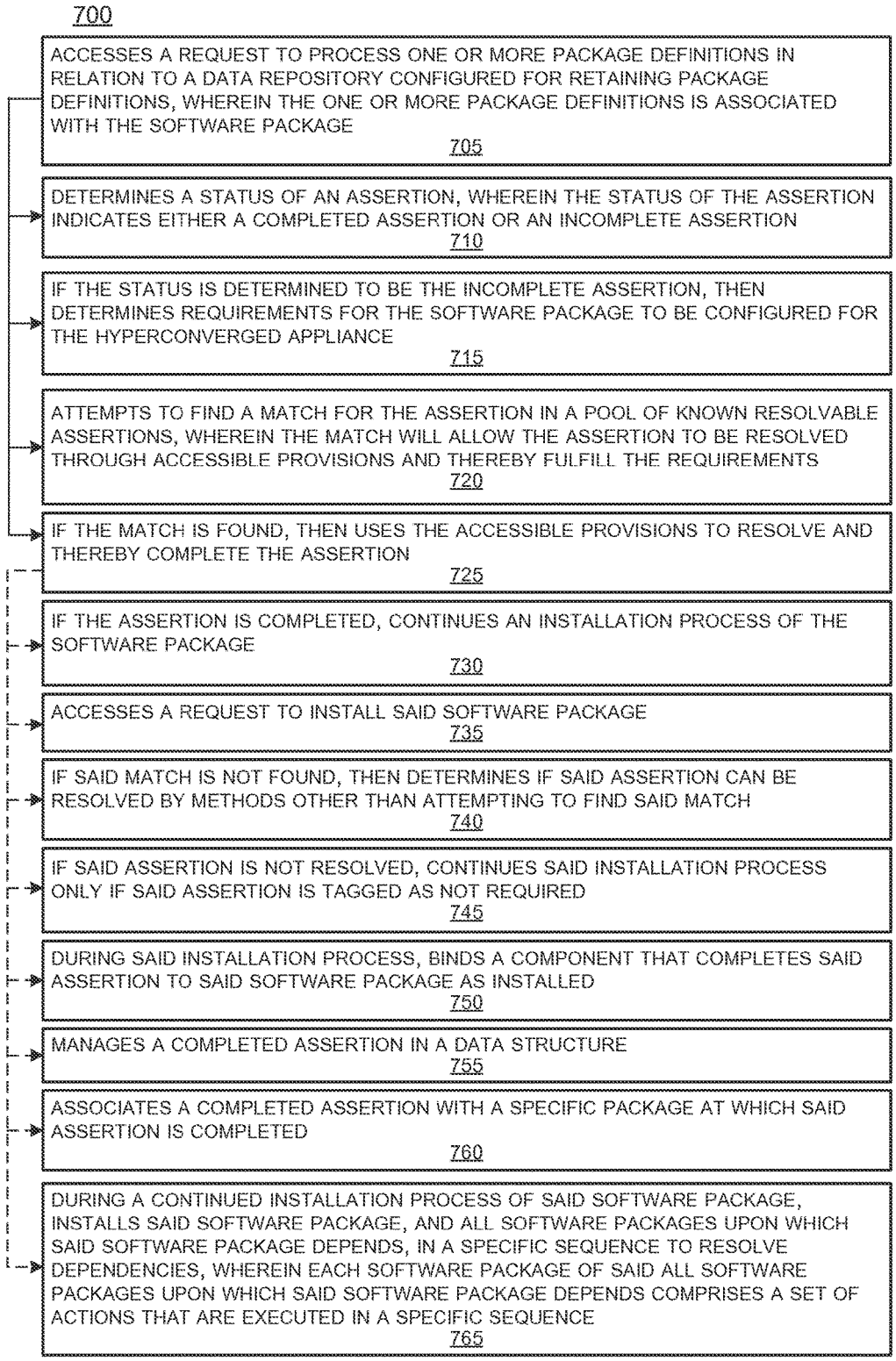
FIG. 7 is a flow diagram for a method for managing a software package across a network for a hyper-converged appliance, in accordance with an embodiment.

FIG. 6 is a block diagram of a package manager 600 for managing a software package 675 across a network for a hyper-converged appliance 670. The package manager 600 includes at least the following modules: a process package definition request accessor 605; an assertion status determiner 610; a requirement determiner 615; a match finder 620; an assertion completer 625; and a software package installer 630. Moreover, embodiments optionally include any of the following: an installation request accessor 635; an alternate assertion resolution determiner 640; an assertion tag determiner 645; a component binder 650; an assertion manager 655; an assertion associator 660; and an installation sequence determiner 665. The aforementioned modules will be further described below.

In one embodiment, the installation request accessor accesses a request to install a software package. The term, "accesses" refers to hereinafter, unless specifically stated otherwise, either receiving, in one embodiment, or retrieving, in another embodiment.

The process package definition request accessor 605 accesses a request to process one or more package definitions in relation to a data repository configured for retaining package definitions, wherein said one or more package definitions is associated with said software package. In various embodiments, the language, "process one or more package definitions", may refer to adding (installing) package definitions to those stored in the data repository. For example, a request to add a package definition to a data repository is accessed. Next, it is then determined if the package definition is already in the data repository. If it is not, then the package definition is added to the data repository. In one embodiment, the existing package definition and assertion dependencies are updated.

In another embodiment, the language, "process one or more package definitions", refers to removing a package definition from the data repository. For example, package definitions may be uninstalled and/or marked as removed from the repository.

In one embodiment, the language, "process one or more package definitions", refers to updating the definitions of packages stored in the data repository. For example, if the software package that the package definition depends upon also has an assertion, then an embodiment will update the package definition to resolve the assertion from the dependency assertion.

In one embodiment, the language, "process one or more package definitions", refers to validating that the accessed package definition is one that is stored in the data repository.

In one embodiment, the language, "process one or more package definitions", refers to the action of determining all package definitions, if any, that depend upon the accessed package definition.

The assertion status determiner 610 determines a status of an assertion, wherein the status of the assertion indicates either a completed assertion or an incomplete assertion.

If the assertion status determiner 610 determines that the status of the assertion is incomplete, then the requirement determiner 615 determines the requirements (e.g., what is needed) for the software package to be properly configured (such that the software package on the hyper-converged appliance functions as intended) for the hyper-converged appliance. For example, embodiments gather the assertion(s) that are associated with the accessed package definition and all package definitions upon which it depends; this is the sum total of the assertions that must be resolved prior to the installation process being allowed to continue. In one instance, an embodiment determines what version of the software package is required based on the version of the hyper-convergent appliance upon which the software package is being installed. In one embodiment, the assertions that were determined to be required are collated. For example, it is determined, based on the assertions found to be required, what software packages and/or portions thereof need to be configured and/or installed first.

The match finder 620 attempts to find a match for the assertion in a pool of known resolvable assertions, wherein such a match will allow the assertion to be resolved through accessible provisions and through such a resolution, fulfill the requirements.

The assertion completer 625 uses the accessible provisions to resolve and thereby complete the assertion. If the assertion is completed, the software package installer 630 moves forward (i.e., continues) with the installation process of the software package. Continuing with the installation process includes: collating the list of actions to be performed as defined by the software package to be modified; and making available, for the action to be performed, assertions that can be completed.

In one embodiment, if the assertion is not resolved, the assertion tag determiner 645 continues the installation process only if the assertion is tagged as not required. In one embodiment, the metadata associated with an assertion describes the assertion as required or preferred, and indicates that a notification or optional notification warning should be sent. Thus, in one embodiment, a warning is sent to a user that a particular assertion that is tagged as preferred is cited. In one embodiment, an error message is generated if a required completed assertion is found to be unavailable. If the incomplete assertion is not required, then a degradation warning message is generated and the installation process is continued.

However, if a match for the assertion is not found within the pool of assertions at the data repository, then, in one embodiment, the alternate assertion resolution determiner 640 determines if the assertion can be resolved by methods other than attempting to find the match. For example, other methods may include, but are not limited to, the following: receiving information from a user via a user prompt; other sources are used, such as other application packages and external sources. Non-limiting examples of external sources are a network (and a service on a network) and the hyper-converged appliance itself.

During the installation process, the component binder 650 binds a component that completes the assertion to the software package as installed. For example, once the assertions have been completed and the sequence of the actions has been determined, each action is executed, providing the collated list of required assertions to each action.

The assertion manager 655, in one embodiment, manages a completed assertion in a data structure.

The assertion associator 660, in one embodiment, associates a completed assertion with a specific package at which the assertion is completed. The term "associates" refers to linking both the completed assertion and the specific package at which the assertion is completed with each other, wherein such linking is evidenced at a data repository accessible to embodiments.

The installation sequence determiner 655, during a continued installation process of a software package, installs the software package, and all software packages upon which the software package depends, in a specific sequence to resolve dependencies, wherein each software package of all software packages upon which the software package depends includes a set of actions that are executed in a specific sequence.

Assuming that the assertions can all be completed, they can be made available for the actions. The package and all packages it depends on will be installed in a specific sequence to resolve dependencies. Each package in turn has a set of actions that need to be executed in a specific sequence. Once the assertions have been completed and the sequence of actions determined, then actions can be executed.

In one or more embodiments, the package manager can be installed on a single computer and manage the packages on that computer associated with an application or operating system, much like yum or apt manages operating system packages. In other embodiments, the package manager can be installed on a computer and manage packages on a cluster of computers, given one or more assertions that define the cluster to be configured. In one or more embodiments, the package manager can be installed on a hyper-converged appliance and configure one or more hyper-converged appliances, leveraging assertions directed at the data stored on the appliance itself to get the structure and configuration of appliances.

Example Methods of Operation

The following discussion sets forth in detail some example methods of operation of embodiments. With reference to FIGS. 1-7, a flow diagram of a method 700 (see FIG. 7) for managing a software package across a network for a hyper-converged appliance is shown, in accordance with an embodiment. Method 700 includes some procedures that, in various embodiments, are carried out by a processor, such as processor 900 of FIG. 9, under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 700 references FIGS. 1-7 unless specifically noted otherwise.

At step 705 of method 700, and as described herein, a request is accessed, wherein the request is one to process one or more package definitions in relation to a data repository which retains package definitions, wherein the one or more package definitions is associated with the software package.

At step 710 of method 700, and as described herein, a status of an assertion is determined, wherein the status of the assertion indicates either a completed assertion or an incomplete assertion.

At step 715, and as described herein, if the status is determined to be the incomplete assertion, then requirements for the software package to be configured for the hyper-converged appliance is determined.

At step 720, and as described herein, finding a match for the assertion to an assertion in a pool of known resolvable assertions is attempted, wherein such match will allow the assertion to be resolved through accessible provisions and thereby fulfills the requirements (for the software package) of step 715.

At step 725, and as described herein, if the match is found, then the accessible provisions are used to resolve and thereby complete the assertion.

At step 730, and as described herein, if the assertion is completed, then the installation process of the software package is completed.

In one embodiment and as described herein, at step 735, a request to install the software package is accessed. This request, once accessed, may be stored in a data repository (such as data repository 810) that is accessible to embodiments.

In one embodiment and as described herein, at step 740, if the match is not found, then it is determined if the assertion can be resolved by methods other than attempting to find the match (described at step 720).

In one embodiment and as described herein, at step 745, if the assertion is not resolved, then the installation process is continued only if the assertion is tagged as not required.

In one embodiment and as described herein, at step 750, during the installation process, a component is bound that completes the assertion to the software package as installed.

In one embodiment and as described herein, at step 755, a completed assertion is managed in a data structure.

In one embodiment and as described herein, at step 760, a completed assertion is associated with a specific package at which the assertion is completed.

In one embodiment and as described herein, at step 765, during a continued installation process of the software package, the software package is installed, and all software packages upon which the software package depends, in a specific sequence to resolve dependencies, wherein each software package of all the software packages upon which the software package depends includes a set of actions that are executed in a specific sequence.

Example System for Managing Software Packages

Figure 8:
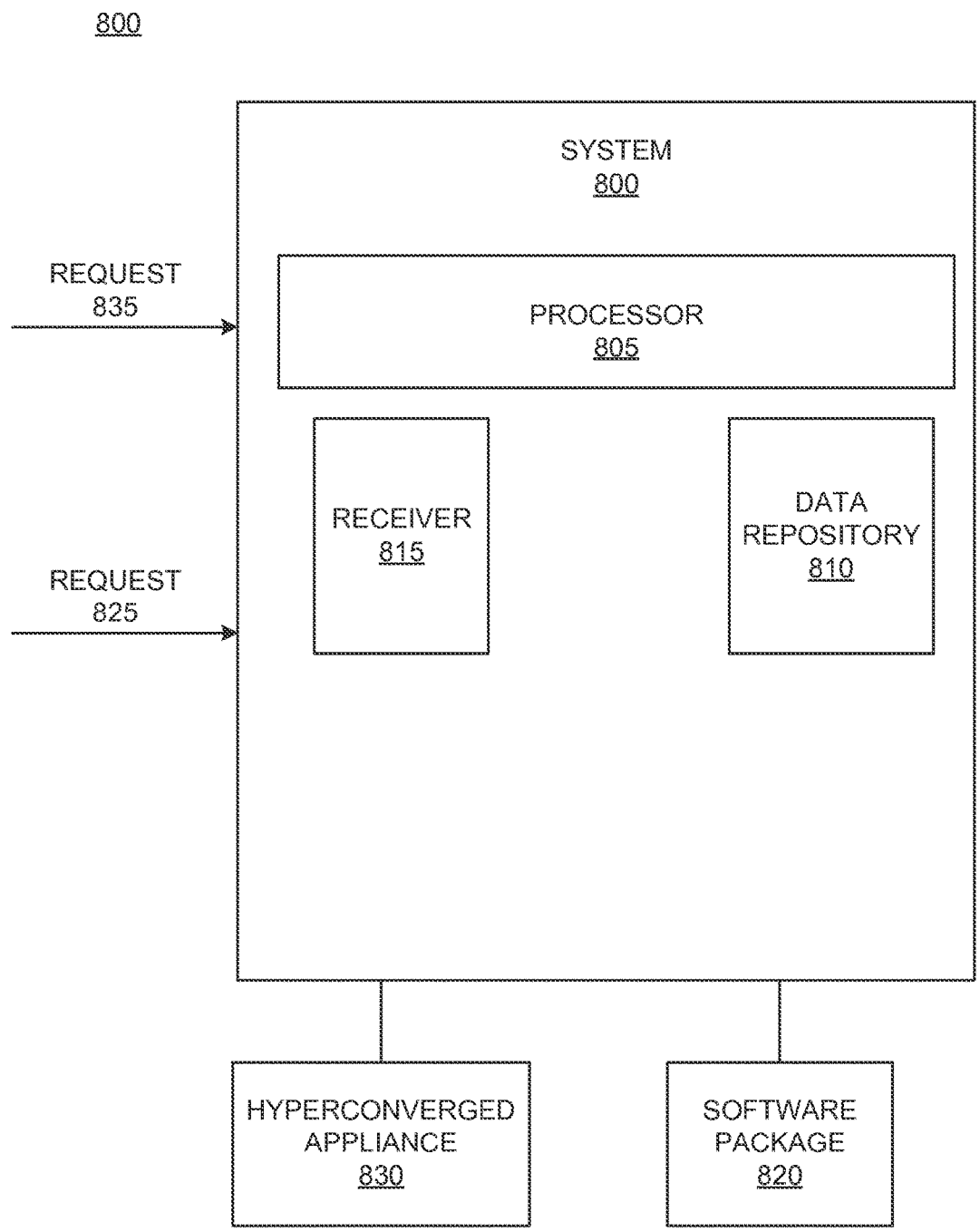
FIG. 8 is a block diagram of an example system, including an example package manager, in accordance with an embodiment.

FIG. 8 is block diagram of a system for managing a software package across a network for a hyper-converged appliance, in accordance with an embodiment. The system 800 includes: a processor 805; a data repository 810; and a receiver 815.

The data repository 810 retains package definitions. In one embodiment, the data repository 810 resides external to, and is communicatively coupled with, the processor 805. While not shown, in another embodiment, the data repository 810 resides at the processor 805.

The receiver 815 receives a request 825 to install a software package 820 on a hyper-converged appliance 830 (a hyper-converged appliance having been described herein). The receiver 820 also receives a request 835 to process one or more package definitions in relation to the data repository 810, wherein the one or more package definitions is associated with the software package 825.

The processor 805 is communicatively coupled with the receiver 815 and is configured to perform the method 700 (of FIG. 7) for managing a software package across a network for a hyper-converged appliance, in accordance with an embodiment.

Example Computer System

Figure 9:
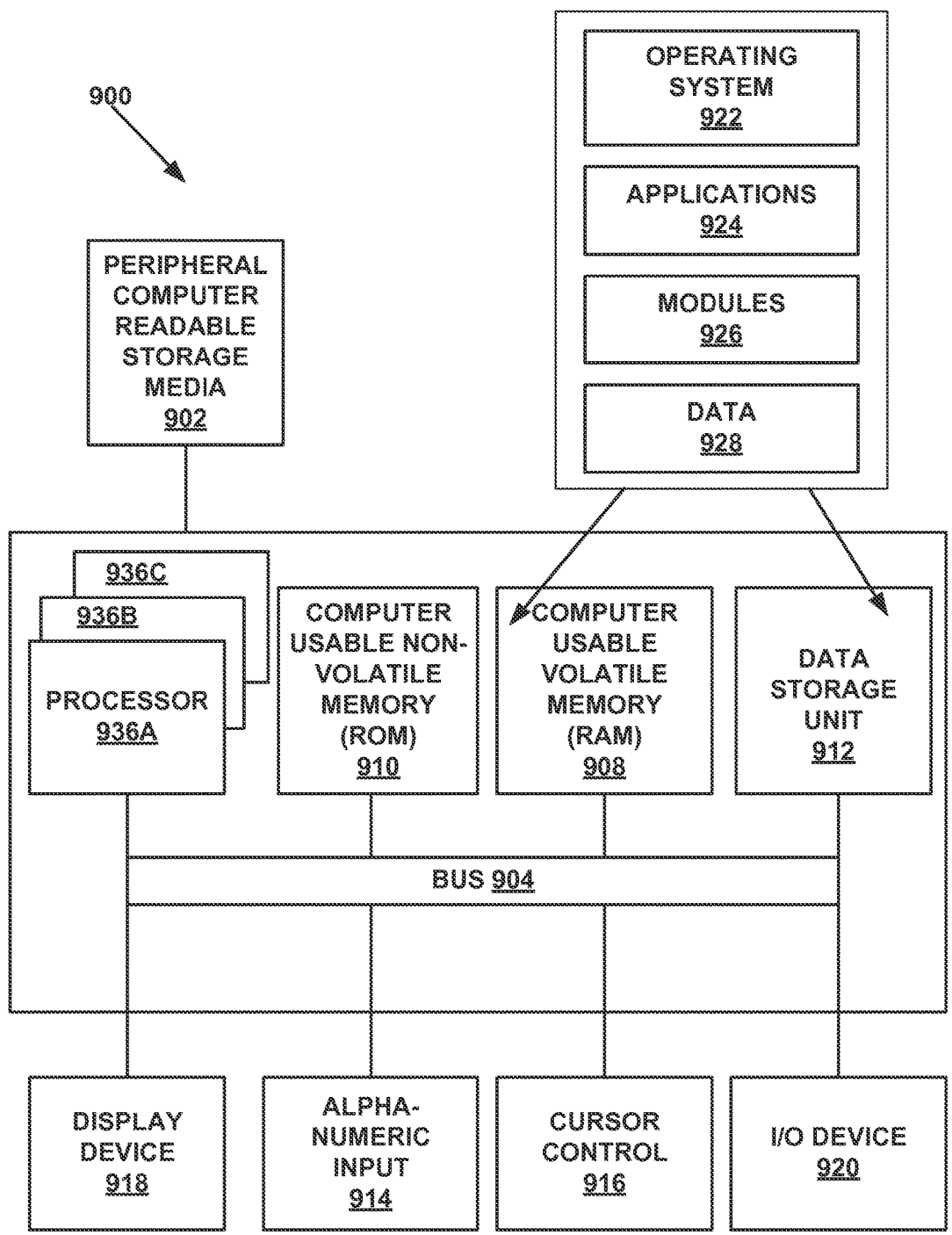
FIG. 9 is a block diagram of an example computer system with which or upon which various embodiments of the present technology may be implemented.

With reference now to FIG. 9, all or portions of some embodiments described herein are composed of computer-readable and computer-executable instructions that reside, for example, in computer-usable/computer-readable storage media of a computer system. That is, FIG. 9 illustrates one example of a type of computer (computer system 900) that can be used in accordance with or to implement various embodiments which are discussed herein. It is appreciated that computer system 900 of FIG. 9 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 900 of FIG. 9 is well adapted to having peripheral non-transitory computer-readable storage media 902 such as, for example, a floppy disk, a compact disc, digital versatile disc, other disc based storage, universal serial bus "thumb" drive, removable memory card, and the like coupled thereto.

System 900 of FIG. 9 includes an address/data bus 904 for communicating information, and a processor 906A coupled with bus 904 for processing information and instructions. As depicted in FIG. 9, system 900 is also well suited to a multi-processor environment in which a plurality of processors 906A, 906B, and 906C are present. Conversely, system 900 is also well suited to having a single processor such as, for example, processor 906A. Processors 906A, 906B, and 906C may be any of various types of microprocessors. System 900 also includes data storage features such as a computer usable volatile memory 908, e.g., random access memory (RAM), coupled with bus 904 for storing information and instructions for processors 906A, 906B, and 906C.

System 900 also includes computer usable non-volatile memory 910, e.g., read only memory (ROM), coupled with bus 904 for storing static information and instructions for processors 906A, 906B, and 906C. Also present in system 900 is a data storage unit 912 (e.g., a magnetic or optical disk and disk drive) coupled with bus 904 for storing information and instructions. System 900 also includes an optional alphanumeric input device 914 including alphanumeric and function keys coupled with bus 904 for communicating information and command selections to processor 906A or processors 906A, 906B, and 906C. System 900 also includes an optional cursor control device 916 coupled with bus 904 for communicating user input information and command selections to processor 906A or processors 906A, 906B, and 906C. In one embodiment, system 900 also includes an optional display device 918 coupled with bus 904 for displaying information.

Referring still to FIG. 9, optional display device 918 of FIG. 9 may be a liquid crystal device, cathode ray tube, plasma display device or other display device suitable for creating graphic images and alphanumeric characters recognizable to a user. Optional cursor control device 916 allows the computer user to dynamically signal the movement of a visible symbol (cursor) on a display screen of display device 918 and indicate user selections of selectable items displayed on display device 918. Many implementations of cursor control device 916 are known in the art including a trackball, mouse, touch pad, joystick or special keys on alphanumeric input device 914 capable of signaling movement of a given direction or manner of displacement. Alternatively, it will be appreciated that a cursor can be directed and/or activated via input from alphanumeric input device 914 using special keys and key sequence commands. System 900 is also well suited to having a cursor directed by other means such as, for example, voice commands. System 900 also includes an I/O device 920 for coupling system 900 with external entities. For example, in one embodiment, I/O device 920 is a modem for enabling wired or wireless communications between system 900 and an external network such as, but not limited to, the Internet.

Referring still to FIG. 9, various other components are depicted for system 900. Specifically, when present, an operating system 922, applications 924, modules 926, and data 928 are shown as typically residing in one or some combination of computer usable volatile memory 908 (e.g., RAM), computer usable non-volatile memory 910 (e.g., ROM), and data storage unit 912. In some embodiments, all or portions of various embodiments described herein are stored, for example, as an application 924 and/or module 926 in memory locations within RAM 908, computer-readable storage media within data storage unit 912, peripheral computer-readable storage media 902, and/or other tangible computer-readable storage media.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What we claim is:

1. An article of manufacture, which comprises a computer readable medium having stored therein a computer program for a method for managing a software package across a network for a pre-configured hyper-converged appliance, said computer program comprising:

a first code segment which, when executed on a computer, accesses a request to process one or more package definitions in relation to a data repository configured for retaining package definitions, wherein said one or more package definitions is associated with said software package;

a second code segment which, when executed on said computer, determines a status of an assertion, wherein said status of said assertion indicates either a completed assertion or an incomplete assertion;

a third code segment which, when executed on said computer, if said status is determined to be said incomplete assertion, then determines requirements for said software package to be configured for said pre-configured hyper-converged appliance;

a fourth code segment which, when executed on said computer, attempts to find a match for said assertion in a pool of known resolvable assertions, wherein said match will allow said assertion to be resolved through accessible provisions and thereby fulfil said requirements;

a fifth code segment which, when executed on said computer, if said match is found, then uses said accessible provisions to resolve and thereby complete said assertion; and a sixth code segment which, when executed on said computer, if said assertion is completed, continues an installation process of said software package, wherein said pre-configured hyper-converged computing appliance further comprises:

pretested, pre-configured and pre-integrated storage, server and network components, including software, that are located in an enclosure; and a hypervisor that supports a virtualization infrastructure.

2. The article of manufacture of claim 1, further comprising:

a seventh code segment which, when executed on said computer, accesses a request to install said software package.

3. The article of manufacture of claim 1, further comprising:

an eighth code segment which, when executed on said computer, if said match is not found, then determines if said assertion can be resolved by methods other than attempting to find said match.

4. The article of manufacture of claim 1, further comprising:

a ninth code segment which, when executed on said computer, if said assertion is not resolved, continues said installation process only if said assertion is tagged as not required.

5. The article of manufacture of claim 1, further comprising:

a tenth code segment which, when executed on said computer, during said installation process, binds a component that completes said assertion to said software package as installed.

6. The article of manufacture of claim 1, further comprising:

an eleventh code segment which, when executed on said computer, manages a completed assertion in a data structure.

7. The article of manufacture of claim 1, further comprising:

a twelfth code segment which, when executed on said computer, associates a completed assertion with a specific package at which said assertion is completed.

8. The article of manufacture of claim 1, further comprising:

a thirteenth code segment which, when executed on said computer, during a continued installation process of said software package, installs said software package, and all software packages upon which said software package depends, in a specific sequence to resolve dependencies, wherein each software package of said all software packages upon which said software package depends comprises a set of actions that are executed in a specific sequence.

9. A package manager for managing a software package across a network for a pre-configured hyper-converged appliance, said package manager comprising:

a package definition request accessor coupled with a processor, said package definition request accessor configured for accessing a request to process one or more package definitions in relation to a repository configured for retaining package definitions, wherein said one or more package definitions is associated with said software package;

an assertion status determiner coupled with said processor, said assertion status determiner configured for determining a status of an assertion, wherein said status of said assertion indicates either a completed assertion or an incomplete assertion;

a requirement determiner coupled with said processor, said requirement determiner configured for, if said status is determined to be said incomplete assertion, then determining requirements for said software package to be configured for said pre-configured hyper-converged appliance;

a match finder coupled with said processor, said match finder configured for attempting to find a match for said assertion in a pool of known resolvable assertions, wherein said match will allow said assertion to be resolved through accessible provisions and thereby fulfil said requirements;

an assertion completer coupled with said processor, said assertion completer configured for using said accessible provisions to resolve and thereby complete said assertion; and a software package installer coupled with said processor, said software package installer configured for, if said assertion is completed, continuing an installation process of said software package, wherein said pre-configured hyper-converged computing appliance further comprises:

pretested, pre-configured and pre-integrated storage, server and network components, including software, that are located in an enclosure; and a hypervisor that supports a virtualization infrastructure.

10. The package manager of claim 9, further comprising:

an installation request accessor coupled with said processor, said installation request accessor configured for accessing a request to install said software package.

11. The package manager of claim 9, further comprising:

an alternate assertion resolution determiner coupled with said processor, said alternate assertion resolution determiner configured for, if said match is not found, then determining if said assertion can be resolved by methods other than attempting to find said match.

12. The package manager of claim 9, further comprising:

an assertion tag determiner coupled with said processor, said assertion tag determiner configured for, if said assertion is not resolved, continuing said installation process only if said assertion is tagged as not required.

13. The package manager of claim 9, further comprising:

a component binder coupled with said processor, said component binder configured for, during said installation process, binding a component that completes said assertion to said software package as installed.

14. The package manager of claim 9, further comprising:
an assertion manager coupled with said processor, said assertion manager configured for managing a completed assertion in a data structure.

15. The package manager of claim 9, further comprising:
an assertion associator coupled with said processor, said assertion associator configured for associating a completed assertion with a specific package at which said assertion is completed.

16. The package manager of claim 9, further comprising:
an installation sequence determiner coupled with said processor, said installation sequence determiner configured for, during a continued installation process of said software package, installing said software package, and all software packages upon which said software package depends, in a specific sequence to resolve dependencies, wherein each software packages of said all software packages upon which said software package depends comprises a set of actions that are executed in a specific sequence.

17. A system for managing a software package across a network for a pre-configured hyper-converged appliance, said system comprising:
a data repository configured for retaining package definitions;
a receiver configured for:
receiving a request to install said software package on said pre-configured hyper-converged appliance; and
receiving a request to process one or more package definitions in relation to said data repository, wherein said one or more package definitions is associated with said software package; and
a processor coupled with said receiver, said processor configured for:
accessing a request to process one or more package definitions in relation to a repository configured for retaining package definitions, wherein said one or more package definitions is associated with said software package;
determining a status of an assertion, wherein said status of said assertion indicates either a completed assertion or an incomplete assertion;
if said status is determined to be said incomplete assertion, then determining requirements for said software package to be configured for said pre-configured hyper-converged appliance;
attempting to find a match for said assertion in a pool of known resolvable assertions, wherein said match will allow said assertion to be resolved through accessible provisions and thereby fulfil said requirements;
using said accessible provisions to resolve and thereby complete said assertion; and
if said assertion is completed, continuing an installation process of said software package, wherein said pre-configured hyper-converged computing appliance further comprises:
pretested, pre-configured and pre-integrated storage, server and network components, including software, that are located in an enclosure; and
a hypervisor that supports a virtualization infrastructure.

18. The system of claim 17, wherein said processor is further configured for:
accessing a request to install said software package.

19. The system of claim 17, wherein said processor is further configured for:
if said match is not found, then determining if said assertion can be resolved by methods other than attempting to find said match.

20. The system of claim 17, wherein said processor is further configured for:
if said assertion is not resolved, continuing said installation process only if said assertion is tagged as not required.

* * * * *